United States Patent
Gopisetty et al.

(10) Patent No.: US 9,329,908 B2
(45) Date of Patent: May 3, 2016

(54) PROACTIVE IDENTIFICATION OF HOTSPOTS IN A CLOUD COMPUTING ENVIRONMENT

(75) Inventors: Sandeep Gopisetty, Morgan Hill, CA (US); Seshashayee S. Murthy, Yorktown Heights, NY (US); Aameek Singh, University Place, WA (US); Sandeep M. Uttamchandani, San Jose, CA (US); David D. Weck, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/893,302

(22) Filed: Sep. 29, 2010

(65) Prior Publication Data

US 2012/0079097 A1    Mar. 29, 2012

(51) Int. Cl.
G06F 15/173    (2006.01)
G06F 9/50    (2006.01)

(52) U.S. Cl.
CPC ........ G06F 9/5083 (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 5,668,995 A | 9/1997 | Bhat | |
| 6,067,412 A | 5/2000 | Blake et al. | |
| 6,470,464 B2 | 10/2002 | Bertram et al. | |
| 6,557,035 B1 | 4/2003 | McKnight | |
| 7,050,956 B2 | 5/2006 | Uysal et al. | |
| 7,296,256 B2 | 11/2007 | Liu et al. | |
| 7,673,189 B2 | 3/2010 | Duyanovich et al. | |
| 8,051,174 B2* | 11/2011 | Xiao et al. | 709/226 |
| 8,055,493 B2* | 11/2011 | Rolia et al. | 703/13 |
| 8,229,999 B2* | 7/2012 | Devarakonda et al. | 709/201 |
| 2001/0039497 A1* | 11/2001 | Hubbard | 705/1 |
| 2006/0023638 A1 | 2/2006 | Monaco et al. | |
| 2009/0125826 A1* | 5/2009 | Haggerty et al. | 715/764 |
| 2010/0020715 A1 | 1/2010 | Monaco et al. | |
| 2011/0231899 A1* | 9/2011 | Pulier et al. | 726/1 |
| 2011/0270968 A1* | 11/2011 | Salsburg et al. | 709/224 |
| 2011/0314232 A2* | 12/2011 | Golbourn | 711/154 |
| 2013/0297800 A1* | 11/2013 | Considine et al. | 709/226 |

OTHER PUBLICATIONS

Mell et al., "The NIST Definition of Cloud Computing", National Institute of Standards and Technology, Information Technology Laboratory, Version 15, Oct. 7, 2009, 2 pages.

(Continued)

*Primary Examiner* — John B Walsh
(74) *Attorney, Agent, or Firm* — Noah A. Sharkan; Maxine L. Barasch; Keohane & D'Alessandro PLLC (57) ABSTRACT

The present invention proactively identifies hotspots in a cloud computing environment through cloud resource usage models that use workload parameters as inputs. In some embodiments the cloud resource usage models are based upon performance data from cloud resources and time series based workload trend models. Hotspots may occur and can be detected at any layer of the cloud computing environment, including the server, storage, and network level. In a typical embodiment, parameters for a workload are identified in the cloud computing environment and inputted into a cloud resource usage model. The model is run with the inputted workload parameters to identify potential hotspots, and resources are then provisioned for the workload so as to avoid these hotspots.

16 Claims, 7 Drawing Sheets

(56) References Cited

OTHER PUBLICATIONS

Maitland, J., "Keeping Control Isn't Easy", Chapter 4: Cloud-Based Infrastructure, SearchCloudComputing.com, 13 pages.

Maitland, J., "Keeping Control Isn't Easy", Chapter 4: Cloud-Based Infrastructure, SearchCloudComputing.com, Publication Date: Oct. 2009, 17 pages.

Zhang et al., "Cloud computing: State-of-the-art and research challenges", J Internet Serv Appl (2010) 1: 7-18. published Apr. 2010.

* cited by examiner

PROACTIVE IDENTIFICATION OF HOTSPOTS IN A CLOUD COMPUTING ENVIRONMENT

TECHNICAL FIELD

The present invention relates to proactively identifying hotspots in a cloud computing environment. Specifically, the present invention relates to proactively identifying hotspots in a cloud computing environment using workload parameters and cloud resource usage models.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

Workloads running in the cloud computing environment on various resources may encounter hotspots, causing performance problems. Traditional methods of handling hotspots include prevention and reactive removal. For example, new workloads may be spread over a distinct set of resources in a round-robin manner to prevent any one resource from being over provisioned. Alternatively, existing hotspots may be mitigated by transferring bottlenecked workloads to available resources.

SUMMARY

The present invention proactively identifies hotspots in a cloud computing environment through cloud resource usage models that use workload parameters as inputs. In some embodiments, the cloud resource usage models are based upon performance data from cloud resources and time series based workload trend models. Hotspots may occur and can be detected at any layer of the cloud computing environment, including the server, storage, and network level. In a typical embodiment, parameters for a workload are identified in the cloud computing environment and inputted into a cloud resource usage model. The model is run with the inputted workload parameters to identify potential hotspots and resources are then provisioned for the workload so as to avoid these hotspots.

A first aspect of the present invention provides a method for proactively identifying hotspots in a cloud computing environment, comprising: identifying parameters associated with a workload running in the cloud computing environment; providing the parameters to a cloud resource usage model; and detecting potential hotspots in the cloud computing environment using the cloud resource usage model.

A second aspect of the present invention provides a system for proactively identifying hotspots in a cloud computing environment, comprising: a bus; a processor coupled to the bus; and a memory medium coupled to the bus, the memory medium comprising instructions to: identify parameters associated with a workload running in the cloud computing environment; provide the parameters to a cloud resource usage model; and detect potential hotspots in the cloud computing environment using the cloud resource usage model.

A third aspect of the present invention provides a computer program product for proactively identifying hotspots in a cloud computing environment, the computer program product comprising a computer readable storage media, and program instructions stored on the computer readable storage media, to: identify parameters associated with a workload running in the cloud computing environment; provide the parameters to a cloud resource usage model; and detect potential hotspots in the cloud computing environment using the cloud resource usage model.

A fourth aspect of the present invention provides a method for deploying a system for proactively identifying hotspots in a cloud computing environment, comprising: providing a computer infrastructure being operable to: identify parameters associated with a workload running in the cloud computing environment; provide the parameters to a cloud resource usage model; detect potential hotspots in the cloud computing environment using the cloud resource usage model; and provision resources for the workload based upon the detecting.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention proactively identifies hotspots in a cloud computing environment through cloud resource usage models that use workload parameters as inputs. In some embodiments, the cloud resource usage models are based upon performance data from cloud resources and time series based workload trend models. Hotspots may occur and can be detected at any layer of the cloud computing environment, including the server, storage, and network level. In a typical embodiment, parameters for a workload are identified in the cloud computing environment and inputted into a cloud resource usage model. The model is run with the inputted workload parameters to identify potential hotspots, and resources are then provisioned for the workload so as to avoid these hotspots.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
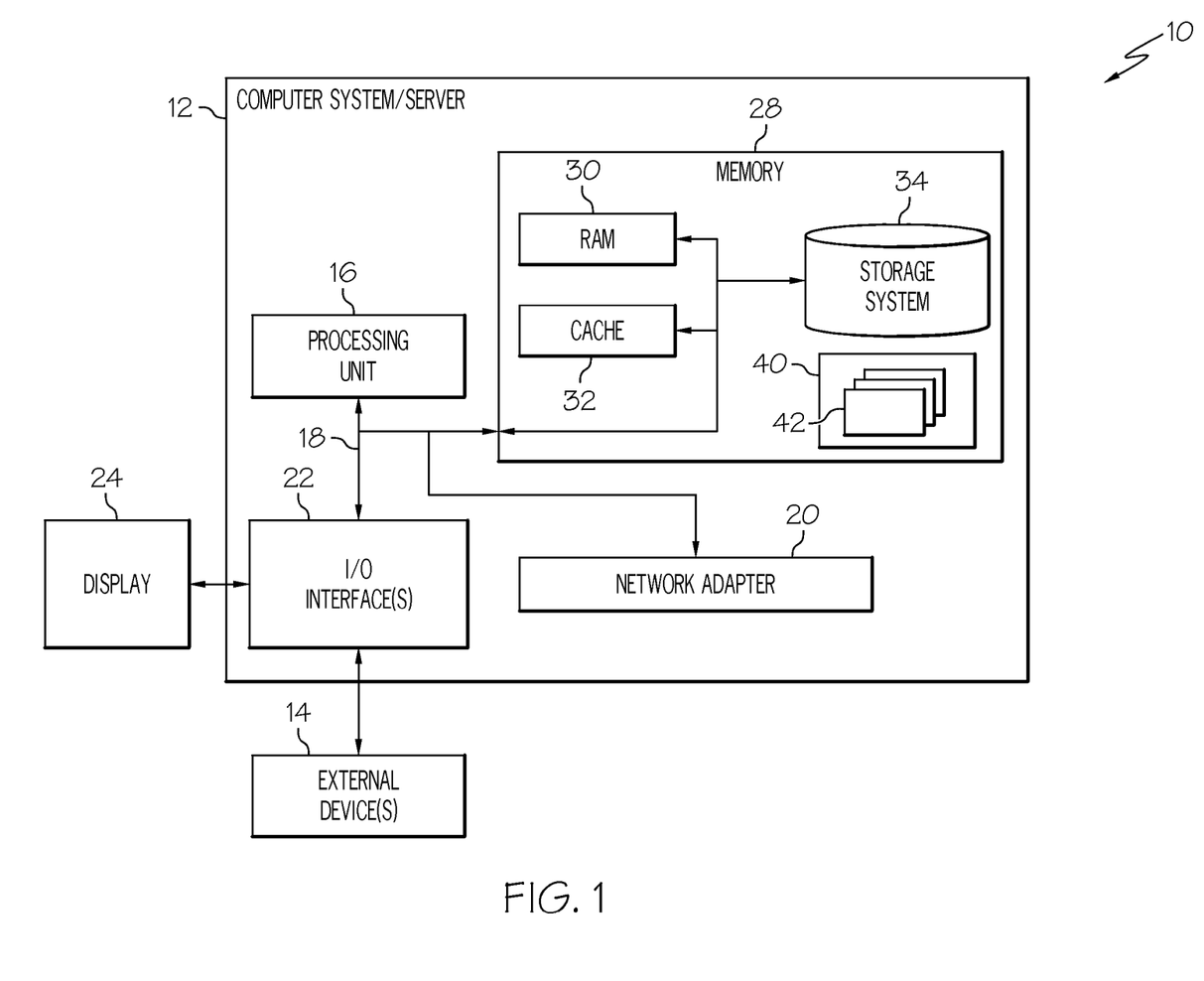
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
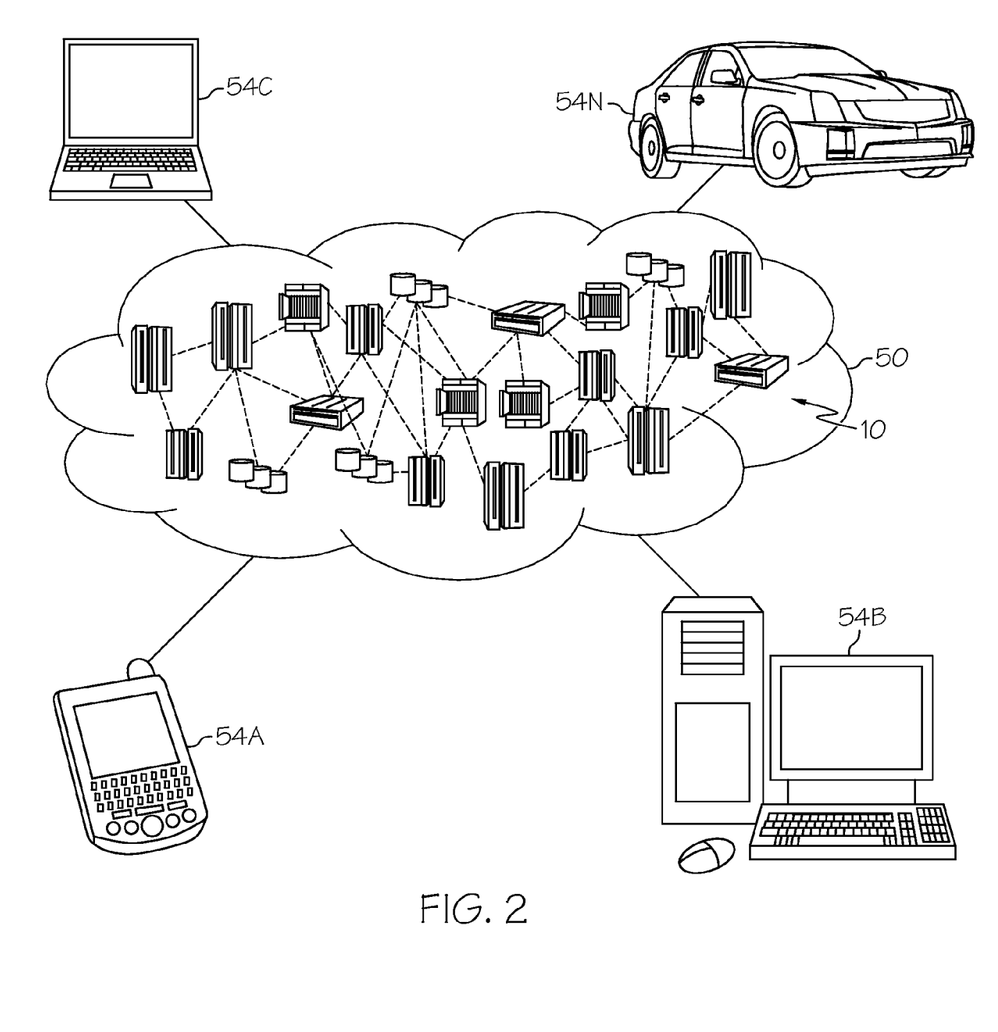
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
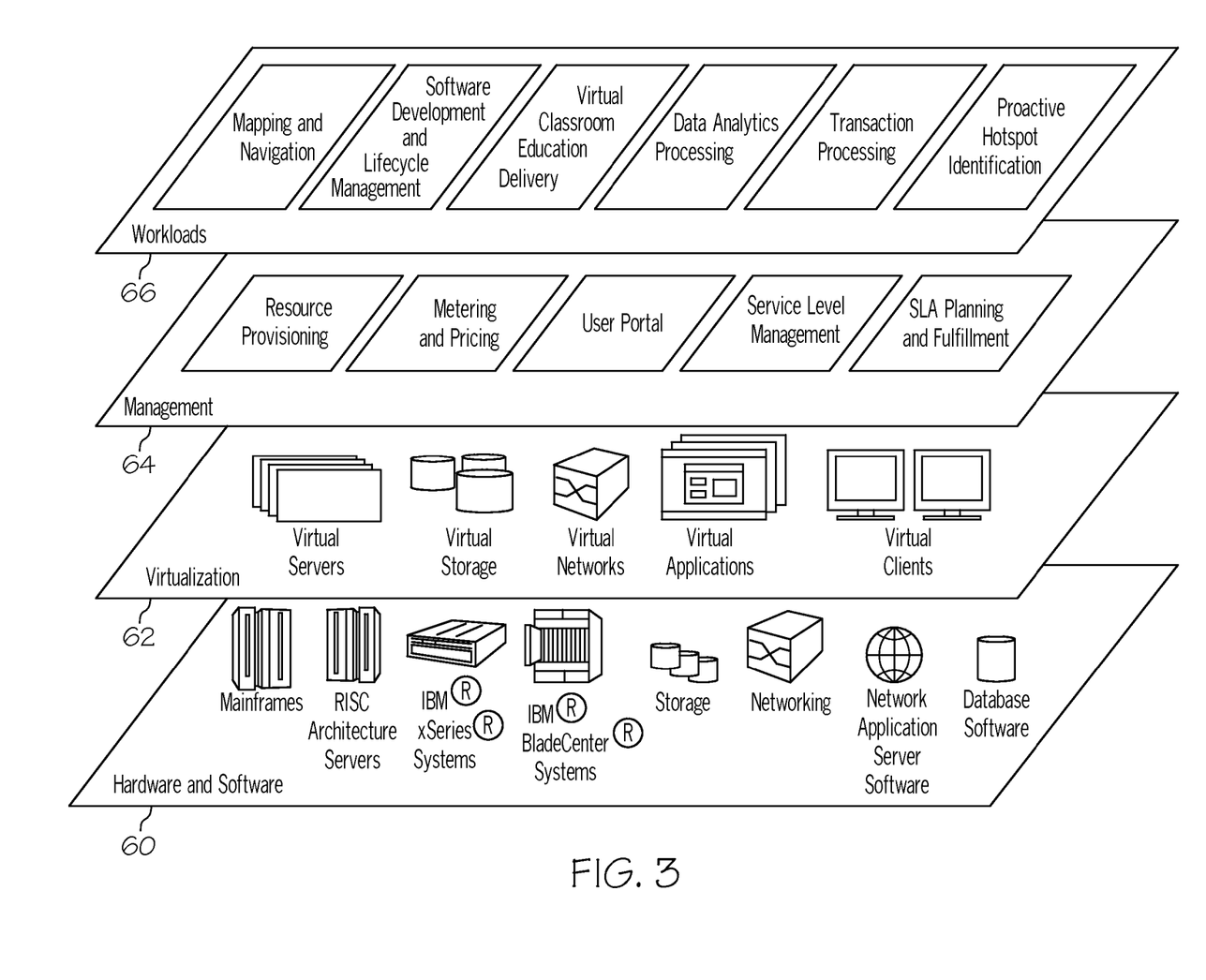
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and proactive hotspot identification. As mentioned above, all of the foregoing examples described with respect to FIG. 3 are illustrative only, and the invention is not limited to these examples.

It is understood all functions of the present invention as described herein are typically performed by the proactive hotspot identification, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Hotspots may occur and can be detected at any layer of the cloud computing environment, including the server, storage, and network level. As is known in the art, a hotspot is an area of the cloud environment in which one or more resources become constrained such that application performance and/or throughput may be limited. Examples of such an area may include compute nodes, storage nodes, and/or networking resources.

Figure 4A:
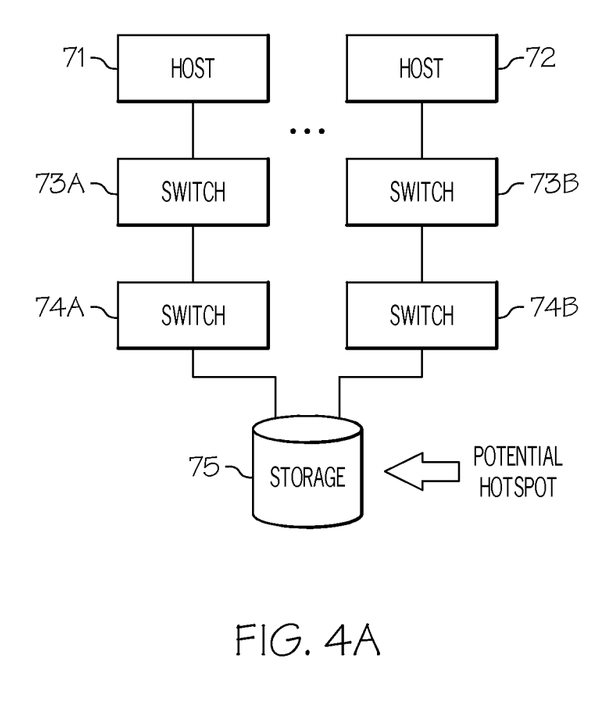
FIGS. 4A and 4B depict a set of example formation of hotspots according to an embodiment of the present invention.
Figure 4B:
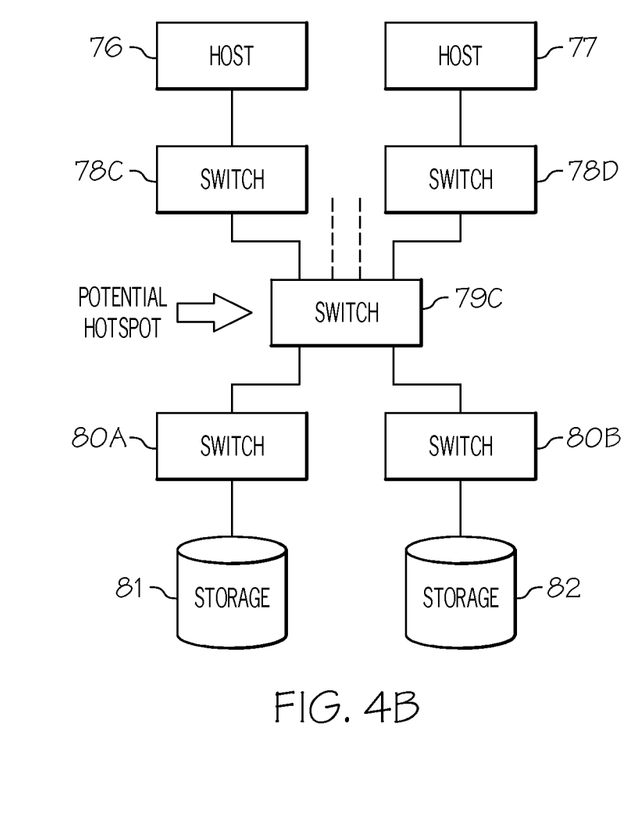

Referring now to FIGS. 4A and 4B, examples of hotspot formations in the cloud computing environment are shown. Specifically, for the purpose of demonstration, hotspots occurring at various locations in the block-based cloud storage environment are shown. Shown in FIG. 4A, single storage subsystem 75, serving data to many host servers, including host servers 71 and 72, can become a potential hotspot. Data may also pass through switches 73A, 73B, 74A and 74B between single storage subsystem 75 and the host servers. In another example shown in FIG. 4B, single switch 79C is performing I/O for a number of host subsystems, including hosts 76 and 77, and storage subsystems, including storage subsystems 81 and 82, and thus has the potential of becoming a hotspot. Data may pass through additional switches such as switches 78C, 78D, 80A, and 80B.

The present invention uses historical data derived from previous workloads to develop predictive models of future workloads, or time series based workload trend models. For example, surges in a workload, which are likely to cause hotspots in one or more resources taxed by high workload, may be recorded, and the likelihood of where and when a similar surge may occur is predicted. Workload parameters, from a current workload, serve as inputs to the time series based workload trend models. Workload parameters describe the workload, and may include, for example, I/O rate, random/sequential ratios, read/write ratios, and cache hit percentage. These are determined from observed values in a system management tool or provided by customers based on the type of application deployed.

Figure 5A:
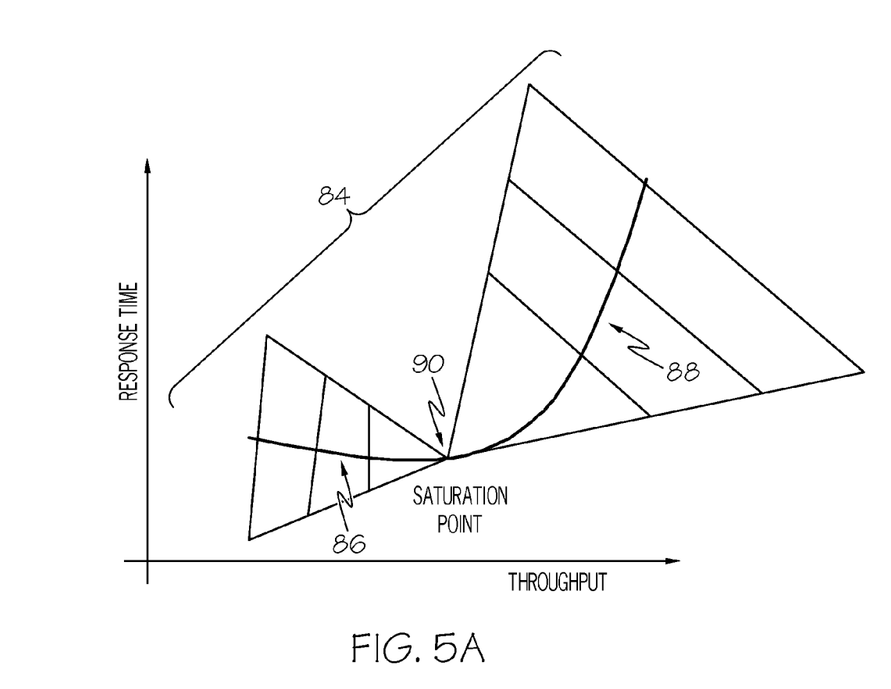
FIGS. 5A and 5B depict example resource models for a storage device according to an embodiment of the present invention.
Figure 5B:
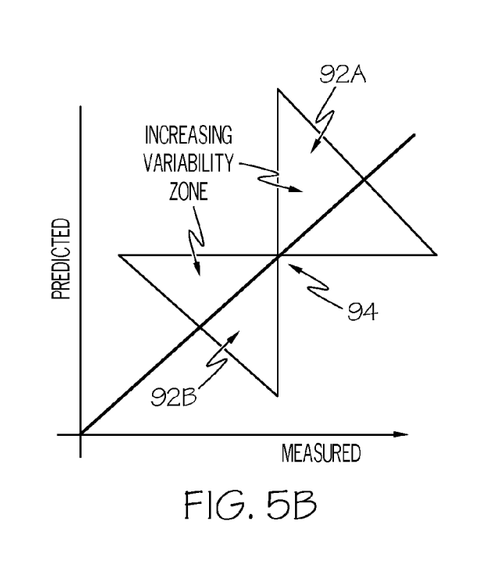

Referring now to FIGS. 5A and 5B, example resource models for a storage device are shown. Performance and configuration statistics are obtained for the resources available in a cloud computing environment from data center or storage management tools, e.g., IBM® TotalStorage® Productivity Center (TPC). (IBM, TotalStorage and related terms are trademarks of IBM Corp. in the United States and other countries). These performance and configuration statistics are used to correlate resources and devices in the cloud with potential workloads in order to predict the resource's or device's response to a new workload, and thereby predict hotspots. Correlation coefficients are used to determine how well the resource loads correlate with workload parameters. If they correlate highly, the prediction model can incorporate those workload parameters to determine with high accuracy the load that a given workload will generate on a resource. Models such as those shown in FIGS. 5A and 5B may be used during this process. FIG. 5A shows typical "hockey stick" response time and throughput curve 84 for a storage device. In first flat phase 86 of the curve, linear regression can capture the device model (i.e., response time and throughput are linearly related). In more curved region 88 of the curve, the subsystem operates under saturation, causing a sudden increase in response times for increasing throughput. FIG. 5B shows the variation of prediction accuracy as a function of distance from saturation point 90 of curve 84. The ideal spot from the prediction accuracy standpoint is where the system is not over-loaded or under-loaded. In FIG. 5B, triangles 92A and 92B represent variability in prediction, which is inversely proportional to accuracy. Convergence 94 of the two triangles corresponds to saturation point 90 of curve 84 where the accuracy is the highest.

Figure 6:
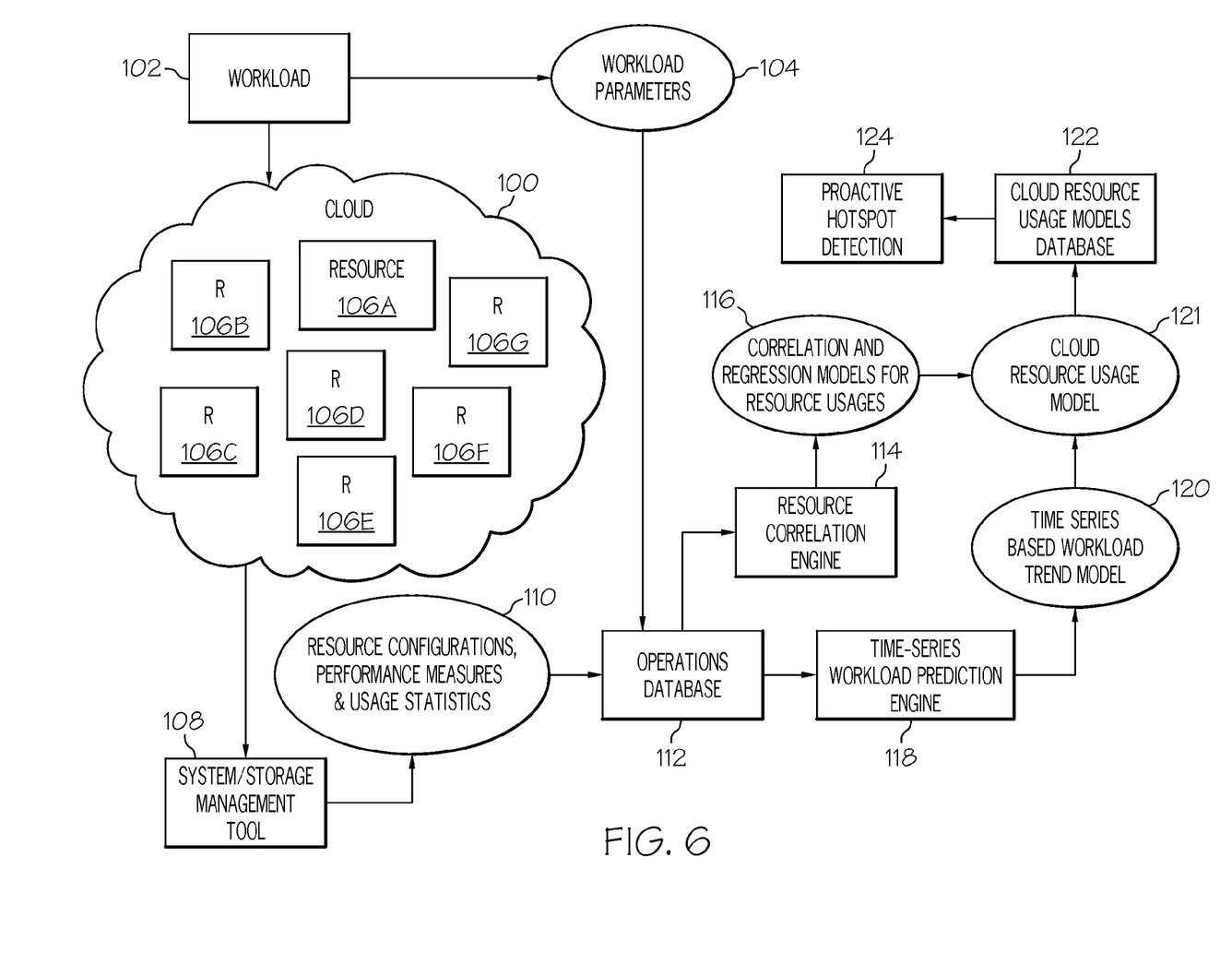
FIG. 6 depicts a system architecture and workflow diagram according to an embodiment of the present invention.

Referring now to FIG. 6, a system architecture and workflow diagram is shown. The system obtains resource configurations, performance measures, and workload usage statistics information 110 for cloud 100, having a plurality of resources 106A-106G, from storage resource management tool 108 (e.g., IBM® TotalStorage® Productivity Center). Information 110 can be stored in operations database 112. Information 110 is used by two components: Resource Correlation Engine 114 and Time-series Workload Prediction Engine 118. Resource Correlation Engine 114 correlates server, storage, and network data to identify the components involved for each workload and creates Correlation and Regression Based Models 116 for resource usages. Time-Series Workload Prediction Engine 118 predicts the amount of load workloads will generate in the near future through Time Series Based Workload Trend Model 120. Together, Time Series Based Workload Trend Model 120 and Correlation and Regression Based Models 116 form Cloud Resource Usage Model 121 which is stored in Cloud Resource Usage Models Database 122. Associated with Workload 102 running in cloud 100 are Workload Parameters 104, which may be provided to Correlation and Regression Based Models 116, Time Series Based Workload Trend Model 120, and Cloud Resource Usage Model 121. Cloud Resource Usage Model 121 with inputted Workload Parameters 104 may then be used for Proactive Hotspot Detection 124 by predicting where hotspots are likely to arise in cloud 100 before resources are provisioned for workload 102. The resource provisioning may thereby avoid causing and/or aggravating these hotspots. From Cloud Resource Usage Models Database 122, Proactive Hotspot Detection 124 component may also identify any current or predicted hotspots in the near future.

Proactive Hotspot Detection 124 has two forms of invocation: interactive and periodic. Interactive invocation may be triggered when an administrator calls for the proactive hotspot detection when adding a new workload, or changing a workload or cloud environment (e.g., retiring a switch), or the like. In response, the system simulates the new workload and uses resource prediction models to identify any component that reaches a very high level of utilization. Periodic invocation may be triggered at a scheduled wake-up, or time interval and execution. Based on workload trend models, the system predicts a workload for the next time interval and uses resource prediction models to calculate resource usages. Administrators are informed if any device becomes a hotspot.

Figure 7:
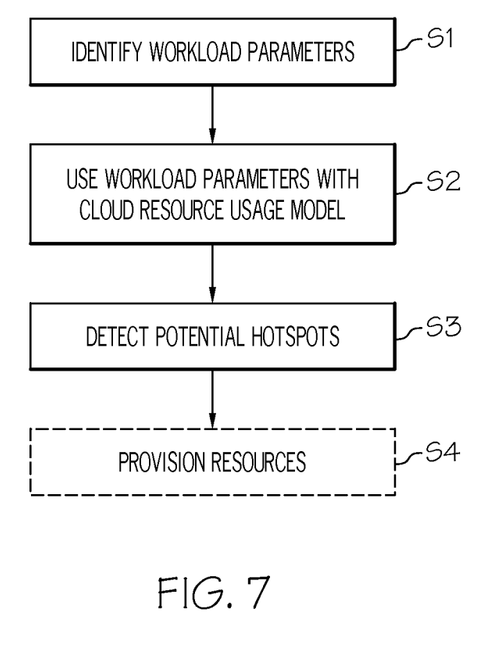
FIG. 7 depicts a method flow diagram according to an embodiment of the present invention.

Referring now to FIG. 7, the steps of the present invention are shown in a flow diagram. In step S1, parameters associated with a workload running in the cloud computing environment are identified. In step S2, the parameters are provided to a cloud resource usage model. In step S3, potential hotspots in the cloud computing environment are detected using the cloud resource usage model. In an optional step S4, resources are provisioned for the workload based upon the detected hotspots so as to minimize triggering these hotspots.

While shown and described herein as a proactive hotspot identification solution, it is understood that the invention further provides various alternative embodiments. For example, in one embodiment, the invention provides a computer-readable/useable medium that includes computer program code to enable a computer infrastructure to provide proactive hotspot identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide proactive hotspot identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for proactive hotspot identification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for proactively identifying hotspots in a particular cloud computing environment, comprising:

identifying parameters associated with a workload, of a plurality of workloads, running in the particular cloud computing environment, the cloud computing environment comprising a plurality of resources;

obtaining resource configuration, performance measures, and workload usage statistics information for the cloud computing environment;

correlating server, storage, and network data to identify resources, of the plurality of resources, involved for each workload of the plurality of workloads;

creating a regression based model based on the correlation of the server, storage, and network data;

predicting an amount of load that the plurality of workloads will generate in the future through a time-series based workload trend model;

forming a cloud resource usage model based on the workload trend model and the regression based model;

providing the parameters to the cloud resource usage model;

detecting, in response to a timed wake-up trigger, at least one potential hotspot in the particular cloud computing environment using the cloud resource usage model, the hotspot comprising one or more resources of the particular cloud computing environment, which become constrained such that at least one of application performance and throughput is limited; and provisioning at least one resource of the particular cloud computing environment for the workload in response to the detecting so as to minimize triggering the at least one potential hotspot;

wherein the one or more resources comprises at least one of a compute node, a storage node, or a networking resource.

2. The method of claim 1, wherein the detecting occurs at one or more of: a server, a storage, and a network level, of the cloud computing environment.

3. The method of claim 1, wherein the workload parameters comprise at least one of the following: I/O rate, random/sequential ratios, read/write ratios, and cache hit percentage.

4. The method of claim 1, wherein the cloud resource usage model comprises performance data collected from a plurality of cloud resources, the plurality of cloud resources correlated with a plurality of potential workloads.

5. A system for proactively identifying hotspots in a particular cloud computing environment, comprising:
a bus;
a processor coupled to the bus; and
a memory medium coupled to the bus, the memory medium comprising instructions to:
identify parameters associated with a workload, of a plurality of workloads, running in the particular cloud computing environment, the cloud computing environment comprising a plurality of resources;
obtain resource configuration, performance measures, and workload usage statistics information for the cloud computing environment;
correlate server, storage, and network data to identify resources, of the plurality of resources, involved for each workload of the plurality of workloads;
create a regression based model based on the correlation of the server, storage, and network data;
predict an amount of load that the plurality of workloads will generate in the future through a time-series based workload trend model;
form a cloud resource usage model based on the workload trend model and the regression based model;
provide the parameters to the cloud resource usage model;
detect, in response to a timed wake-up trigger, at least one potential hotspot in the particular cloud computing environment using the cloud resource usage model, the hotspot comprising one or more resources of the particular cloud computing environment, which become constrained such that at least one of application performance and throughput is limited; and
provision at least one resource of the particular cloud computing environment for the workload in response to the detecting so as to minimize triggering the at least one potential hotspot;
wherein the one or more resources comprises at least one of a compute node, a storage node, or a networking resource.

6. The system of claim 5, wherein the workload parameters comprise at least one of the following: I/O rate, random/sequential ratios, read/write ratios, and cache hit percentage.

7. The system of claim 5, wherein the cloud resource usage model comprises performance data collected from a plurality of cloud resources, the plurality of cloud resources correlated with a plurality of potential workloads.

8. The system of claim 5, wherein the detection occurs at one or more of: a server, a storage, and a network level, of the cloud computing environment.

9. A computer program product for proactively identifying hotspots in a particular cloud computing environment, the computer program product comprising a non-transitory computer readable storage medium and program instructions stored on the non-transitory computer readable storage medium, to:
identify parameters associated with a workload, of a plurality of workloads, running in the particular cloud computing environment, the cloud computing environment comprising a plurality of resources;
obtain resource configuration, performance measures, and workload usage statistics information for the cloud computing environment;
correlate server, storage, and network data to identify resources, of the plurality of resources, involved for each workload of the plurality of workloads;
create a regression based model based on the correlation of the server, storage, and network data;
predict an amount of load that the plurality of workloads will generate in the future through a time-series based workload trend model;
form a cloud resource usage model based on the workload trend model and the regression based model;
provide the parameters to the cloud resource usage model;
detect, in response to a timed wake-up trigger, at least one potential hotspot in the particular cloud computing environment using the cloud resource usage model, the hotspot comprising one or more resources of the particular cloud computing environment, which become constrained such that at least one of application performance and throughput is limited; and
provision at least one resource of the particular cloud computing environment for the workload in response to the detecting so as to minimize triggering the at least one potential hotspot;
wherein the one or more resources comprises at least one of a compute node, a storage node, or a networking resource.

10. The computer program product of claim 9, wherein the workload parameters at least one of the following: I/O rate, random/sequential ratios, read/write ratios, and cache hit percentage.

11. The computer program product of claim 9, wherein the cloud resource usage model comprises performance data collected from a plurality of cloud resources, the plurality of cloud resources correlated with a plurality of potential workloads.

12. The computer program product of claim 9, wherein the detection occurs at one or more of: a server, a storage, and a network level of the cloud computing environment.

13. A method for proactively identifying hotspots in a particular cloud computing environment, comprising:
providing a computer infrastructure being operable to:
identify parameters associated with a workload, of a plurality of workloads, running in the particular cloud computing environment, the cloud computing environment comprising a plurality of resources;

obtain resource configuration, performance measures, and workload usage statistics information for the cloud computing environment;
correlate server, storage, and network data to identify resources, of the plurality of resources, involved for each workload of the plurality of workloads;
create a regression based model based on the correlation of the server, storage, and network data;
predict an amount of load that the plurality of workloads will generate in the future through a time-series based workload trend model;
form a cloud resource usage model based on the workload trend model and the regression based model;
provide the parameters to the cloud resource usage model;
detect, in response to a timed wake-up trigger, at least one potential hotspot in the particular cloud computing environment using the cloud resource usage model, the hotspot comprising one or more resources of the particular cloud computing environment, which become constrained such that at least one of application performance and throughput is limited; and
provision at least one resource of the particular cloud computing environment for the workload in response to the detecting so as to minimize triggering the at least one potential hotspot;
wherein the one or more resources comprises at least one of a compute node, a storage node, or a networking resource.

14. The method of claim 13, wherein the workload parameters at least one of the following: I/O rate, random/sequential ratios, read/write ratios, and cache hit percentage.

15. The method of claim 13, wherein the cloud resource usage model further comprises:
performance data collected from a plurality of cloud resources, the plurality of cloud resources correlated with a plurality of potential workloads.

16. The method of claim 13, wherein the detection occurs at one or more of: a server, a storage, and a network level of the cloud computing environment.

* * * * *